May 13, 1952    H. W. KROHN, JR    2,596,856

TIRE PRESSURE GAUGE

Filed Nov. 29, 1949

INVENTOR.
HARRY W. KROHN JR.
BY Hudson, Boughton,
Williams, David & Hoffmann.
ATTORNEYS Patented May 13, 1952

2,596,856

UNITED STATES PATENT OFFICE 2,596,856

TIRE PRESSURE GAUGE

Harry W. Krohn, Jr., Cleveland, Ohio, assignor to
The Dill Manufacturing Company, Cleveland,
Ohio, a corporation of Ohio Application November 29, 1949, Serial No. 129,885

1 Claim. (Cl. 73—419)

This invention relates to a gauge for measuring air pressures in inflatable containers as, for example, the air pressures in the pneumatic tires of a motor vehicle.

An object of the invention is to provide an air gauge which is extremely simple in design and is constructed of relatively few parts that are easy and inexpensive to manufacture and assemble.

A further object is to provide an air gauge which is so inexpensive that it can be sold as a novelty item to be distributed as an advertising medium to car owners and is of such convenient size and simplicity as to be readily used by the car owners and carried by them either in their cars or on their persons.

A still further object is to provide an air gauge as referred to in the preceding objects and which includes a novel chuck construction for applying the gauge to the valve stem of an inflatable article such as a pneumatic tire.

Further and additional objects and advantages not hereinbefore referred to will become apparent hereinafter during the detailed description of an embodiment of the invention which is to follow.

Figure 2:
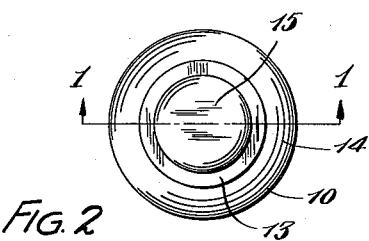
Figure 1:
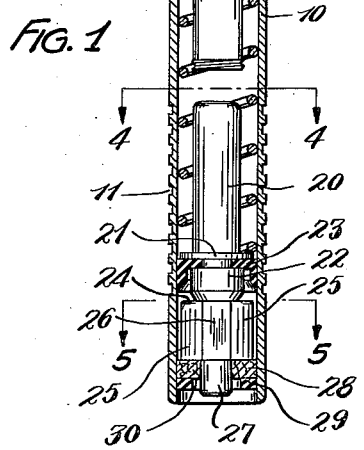

Referring to the accompanying drawing illustrating such embodiment of the invention, Fig. 1 is a longitudinal sectional view through the air gauge and is taken substantially on line 1—1 of Fig. 2 looking in the direction of the arrows.

Fig. 2 is an end view of the air gauge shown in Fig. 1 and is taken looking at the upper end of the gauge as shown in the drawing.

Figure 3:
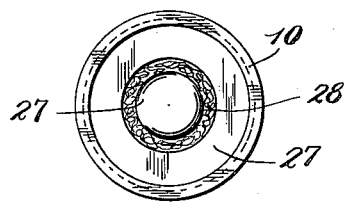
Figure 4:
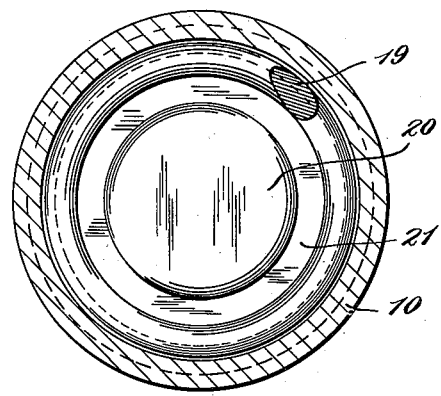
Figure 5:
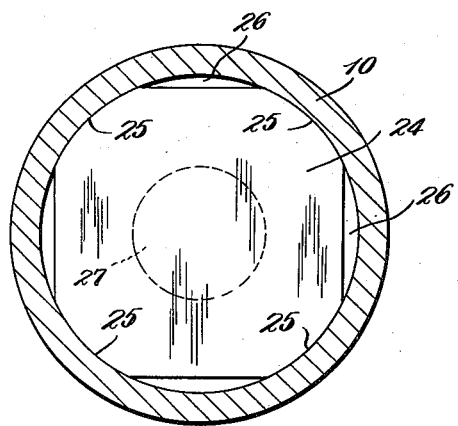

Fig. 3 is an end view of the gauge shown in Fig. 1 and is taken looking at the lower end of the gauge as viewed in the drawing, and Figs. 4 and 5 are transverse sectional views through the gauge and are taken, respectively, on lines 4—4 and 5—5 of Fig. 1 looking in the direction of the arrows.

The gauge shown in the drawing comprises an elongated cylindrical casing 10 of relatively small cross-sectional diameter comparable to the cross-sectional diameter of the usual pencil. The casing 10 may be formed of metal, plastic or any other suitable material for the purpose. In Fig. 1 the casing 10 is shown as provided on its exterior with circular grooves 11 to form a roughened surface portion which can be gripped by the gauge user to facilitate the application of the gauge to a valve stem.

The upper end of the gauge, as viewed in Fig. 1, includes a guide plug 12 mounted in the casing 10 with a tight or forced fit and having at one end a short extended circular boss 13 which projects a short distance beyond the end of the casing. The said one end of the casing is turned or flanged inwardly over the guide plug 12 as indicated at 14 to positively retain the plug in proper position in the casing. The plug 12 is provided with a central bore therethrough which slidably mounts the gauge bar 15 that is shown as circular in cross-section, in this instance, and which carries suitable graduation marks and indicia calibrated in air pounds pressure. The plug member 12 adjacent its inner end is provided with a counterbore 16 concentric with the guide bore through the plug member and said counterbore 16 may mount a suitable friction element 17 which frictionally grips the gauge bar and acts to hold the gauge bar in the position to which it has been extended by air pressure during the use of the gauge so that the user can take a gauge reading. Of course the element 17 could be omitted, and further the gauge bar could be arranged to return to its normal position under spring load as soon as the gauge is disconnected from the valve stem. At the inner end of the plug member 12 there is mounted in fixed position a washer 18 acting as an abutment for one end of a coil spring 19 mounted in the casing and later to be referred to.

The gauge further includes a gauge piston consisting of a piston rod portion 20 in axial alignment with the gauge bar 15 and shown as circular in cross-section and substantially of the same diameter as the gauge bar 15. The piston rod 20 mounts a flange or washer 21 which may be integral with or secured to the rod in any suitable manner and a head 22 likewise secured to the rod in any suitable manner. The head 22 clamps between it and the washer 21 a flexible cup-shaped piston packing 23 which sealingly and slidably engages the inner wall of the casing 10. The coil spring 19 previously referred to surrounds the gauge bar 15 and the piston rod 20 and, as already stated, one end abuts the washer 18 while the other end of the spring abuts the washer 21 of the piston. It will thus be seen that movement of the piston under air pressures is resisted by the spring 19 and the strength of this spring will be calibrated in relation to the air pressures to which the piston will be subjected.

It will also be noted that the movement of the piston by air pressures applied thereto will cause the piston rod 20 to engage the end of the gauge bar 15 so that the latter will move with the piston and thus give readings of the air pressures to which the piston is subjected. When the gauge is removed from the valve stem the spring 19 will act on the piston to return it to its normal position as shown in Fig. 1.

The chuck part of the gauge comprises a solid polygonal block 24 shown, in this instance, as substantially square but as having its corners formed on the internal radius of the casing 10 as indicated at 25 in Fig. 5. The chuck block 24 has a tight or pressed fit in the casing 10 and the gauge piston in its normal position has the head 22 contacting with the inner end of the block 24 as shown in Fig. 1. The straight sides of the block 24 intermediate its curved corners 25 form with the casing 10 longitudinally extending air passages 26 as clearly indicated in Fig. 5.

The outer or lower end of the block 24, as viewed in the drawing, mounts centrally of the block an outwardly or downwardly extending chuck pin 27 which can be integral with the block or separate therefrom and secured thereto. The chuck part of the gauge further comprises a felt washer 28 mounted on the pin 27 and engaging the lower end of the block 24 and outwardly of the felt washer 28 a washer 29 formed of suitable material such as rubber either natural or synthetic.

It will be understood that when the gauge is applied to a valve stem the end of the stem will sealingly engage the washer 29 while the pin 27 will engage the valve pin of the core or insides carried by the stem and depress the latter to open the valve of the insides or core. This will allow air to flow from the stem around the pin 27 in the space 30 formed by the opening in the washer 29 and thence through the felt washer 28 and the air passages 26 to act on the gauge piston to move the latter against the spring 19 and cause the gauge bar 15 to be moved outwardly of the gauge to give a gauge reading.

Although the washers 28 and 29 may be formed in various ways an advantageous way of forming these elements will now be briefly described. The felt from which the washers 28 are formed may be obtained in sheets while the material constituting the washer 29 may be molded in sheets. Then these sheets of felt and material are secured together by cementing or other suitable means, cut in strips, after which the washers 28 and 29 are unitarily blanked from the composite strips.

From the foregoing description it will be seen that the gauge is extremely simple in construction, is formed of relatively few parts which can be easily and economically manufactured and assembled. It will also be apparent that the gauge can be so inexpensively produced as to enable it to be sold at a sufficiently low price that it can be utilized as a novelty and advertising item for distribution to car owners. In addition, it will have been noted that the chuck part of the gauge is of novel construction and is such that it can be easily and economically manufactured and assembled in the gauge.

Although a preferred embodiment of the invention has been illustrated and described herein it will be understood that the invention is susceptible of various modifications and adaptations within the scope of the appended claim.

Having thus described my invention, I claim:

In combination with an elongated tubular casing adapted to be used as an air gauge casing and to contain and slidably support a gauge bar for extension therefrom at one end of the casing and having a piston in said casing operatively associated with the gauge bar, a block mounted in said casing adjacent the other end thereof and having surface portions engaging said casing and surface portions spaced from said casing and forming therewith air passages extending the length of said block and communicating with the interior of said casing, said block being provided with a centrally disposed pin on the end of the block toward said other end of the casing, a perforate washer on said end of the block and surrounding said pin, and a flexible washer on the outer side of said felt washer and provided with an opening through which said pin extends with a clearance therebetween, said other end of said casing being circular in cross section and said block being polygonal in cross section and having its corners formed concentrically to the interior of said other end of said casing to tightly interfit the same with a pressed fit while its straight sides are spaced from the interior of said casing and form therewith the air passages which extend the length of the block and place the outer end of the block in communication with the interior of the casing.

HARRY W. KROHN, Jr.

REFERENCES CITED

The following references are of record in the file of this patent:

UNITED STATES PATENTS

| Number | Name | Date |
|---|---|---|
| 1,276,899 | Gilling | Aug. 27, 1918 |
| 1,388,275 | Low | Aug. 23, 1921 |
| 1,724,567 | Deren | Aug. 13, 1929 |
| 1,774,153 | Pfeiffer | Aug. 26, 1930 |
| 2,049,532 | Williams | Aug. 4, 1936 |
| 2,050,084 | Carliss | Aug. 4, 1936 |

FOREIGN PATENTS

| Number | Country | Date |
|---|---|---|
| 29,441 | Great Britain | Sept. 19, 1907 |